Aug. 18, 1936.  F. E. TURNER ET AL  2,051,062
APPARATUS FOR LOADING AND UNLOADING VEHICLES
Filed Dec. 26, 1931  7 Sheets-Sheet 1

INVENTORS.
Frederick E. Turner and
William P. Allred Jr.
BY
ATTORNEY.

Aug. 18, 1936.   F. E. TURNER ET AL   2,051,062
APPARATUS FOR LOADING AND UNLOADING VEHICLES
Filed Dec. 26, 1931   7 Sheets-Sheet 2
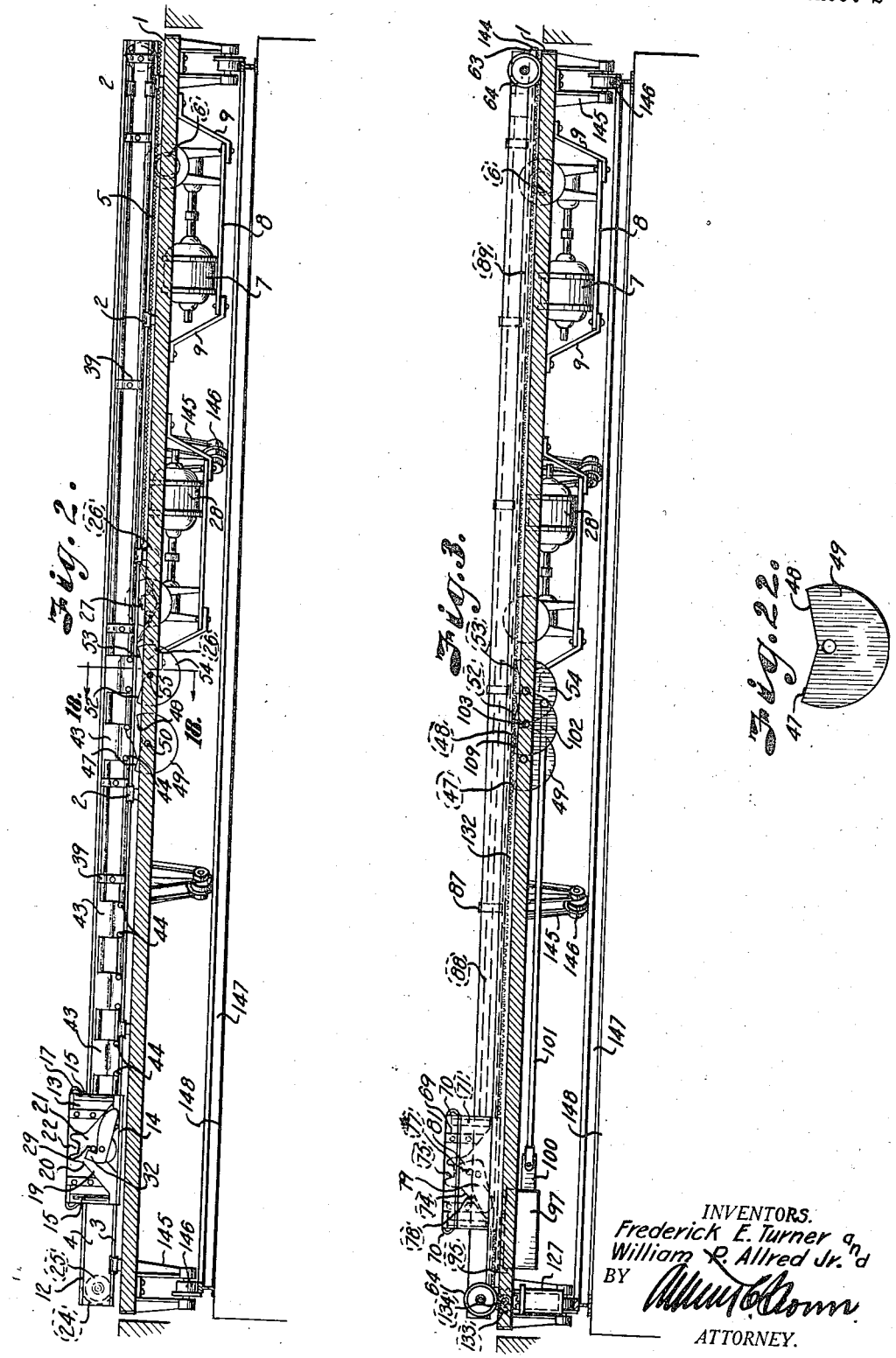
INVENTORS.
Frederick E. Turner and
William R. Allred Jr.
BY
ATTORNEY.

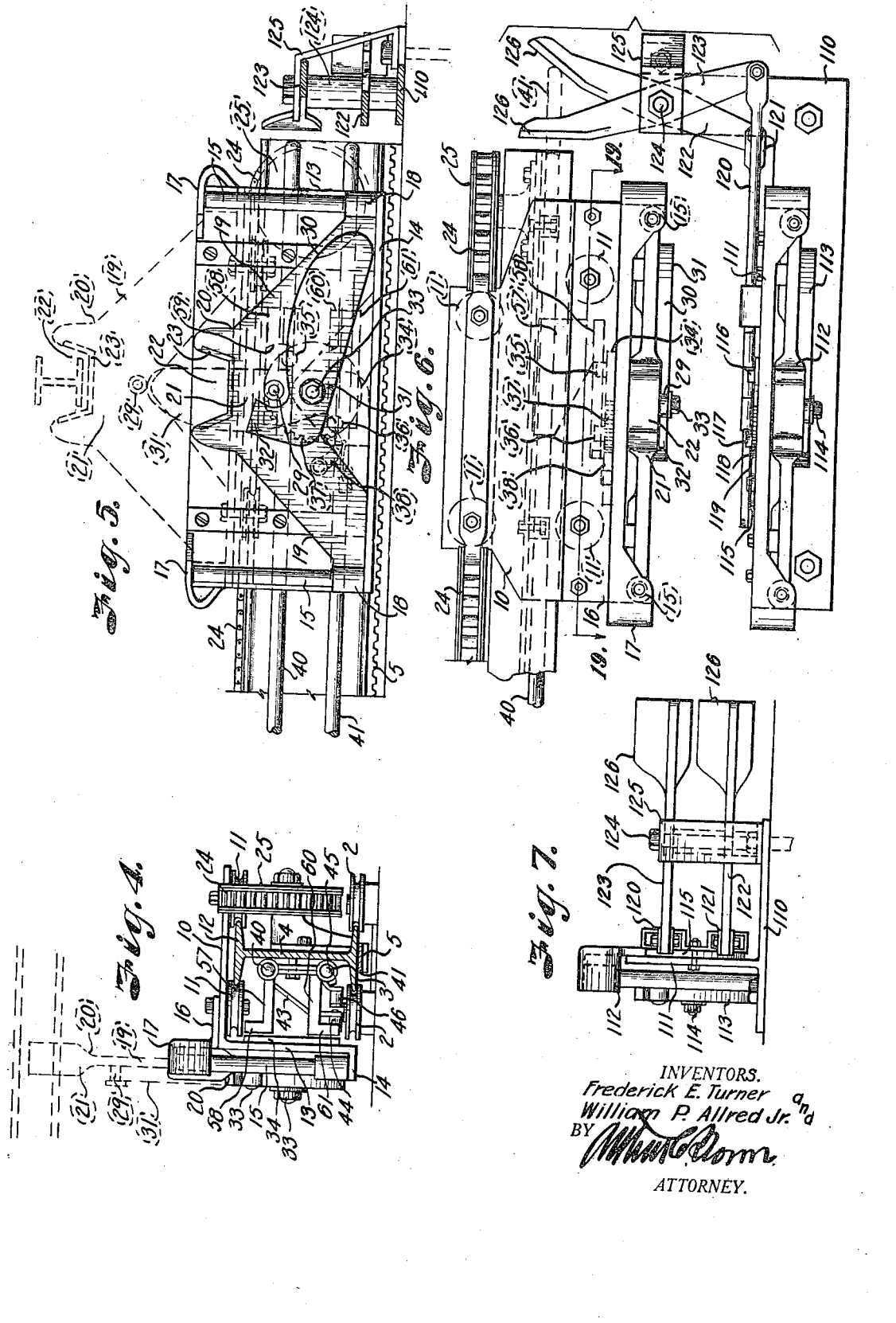

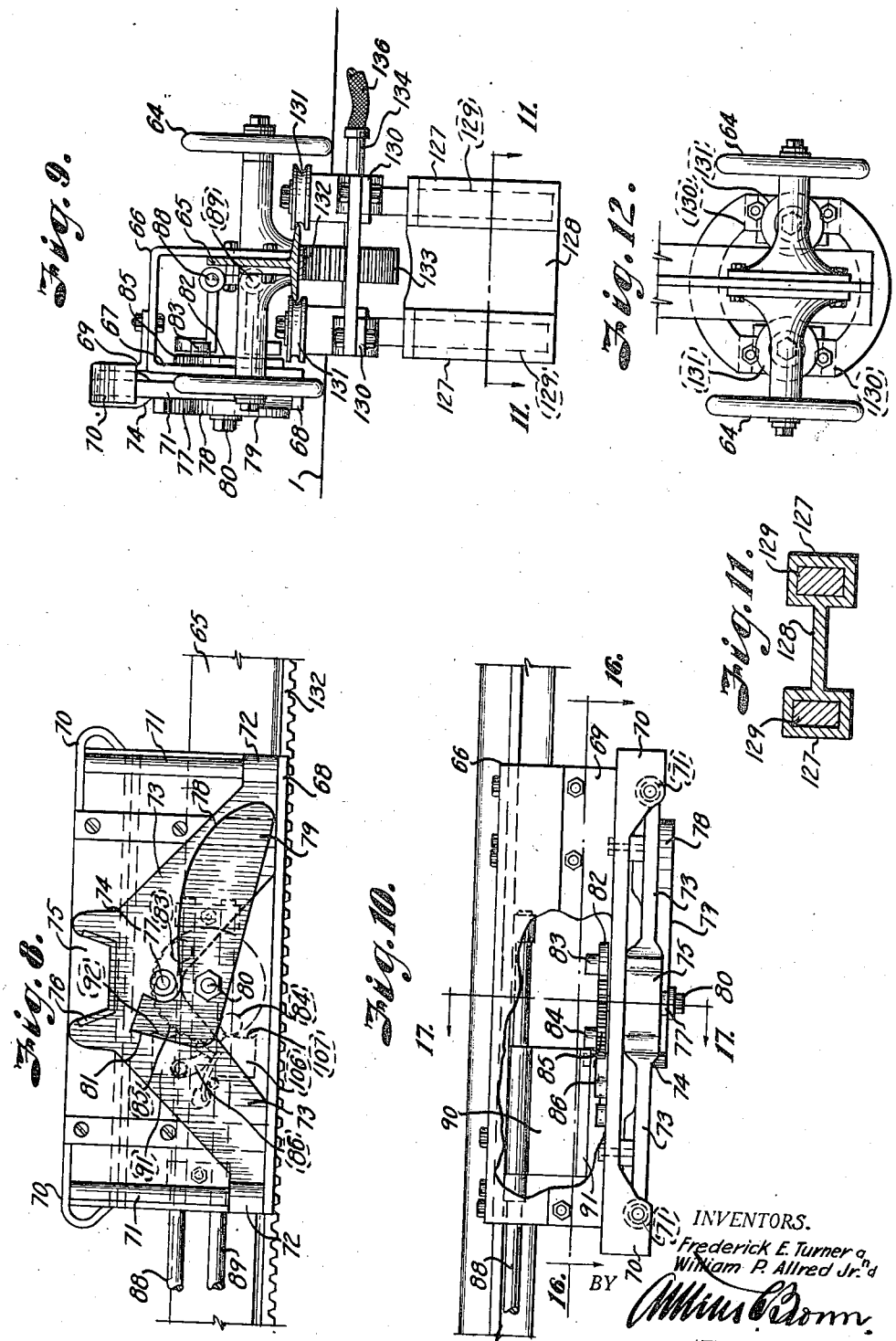

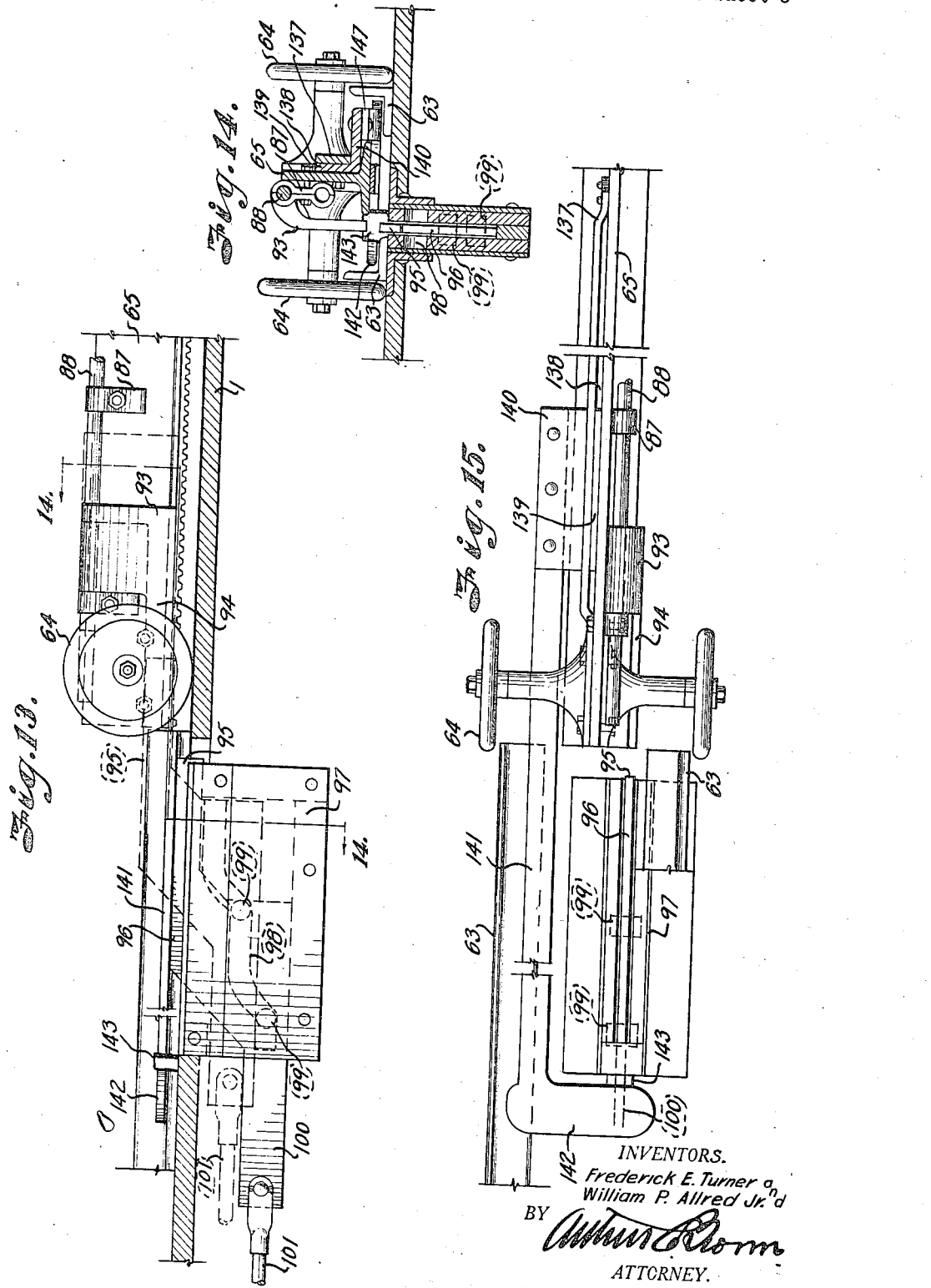

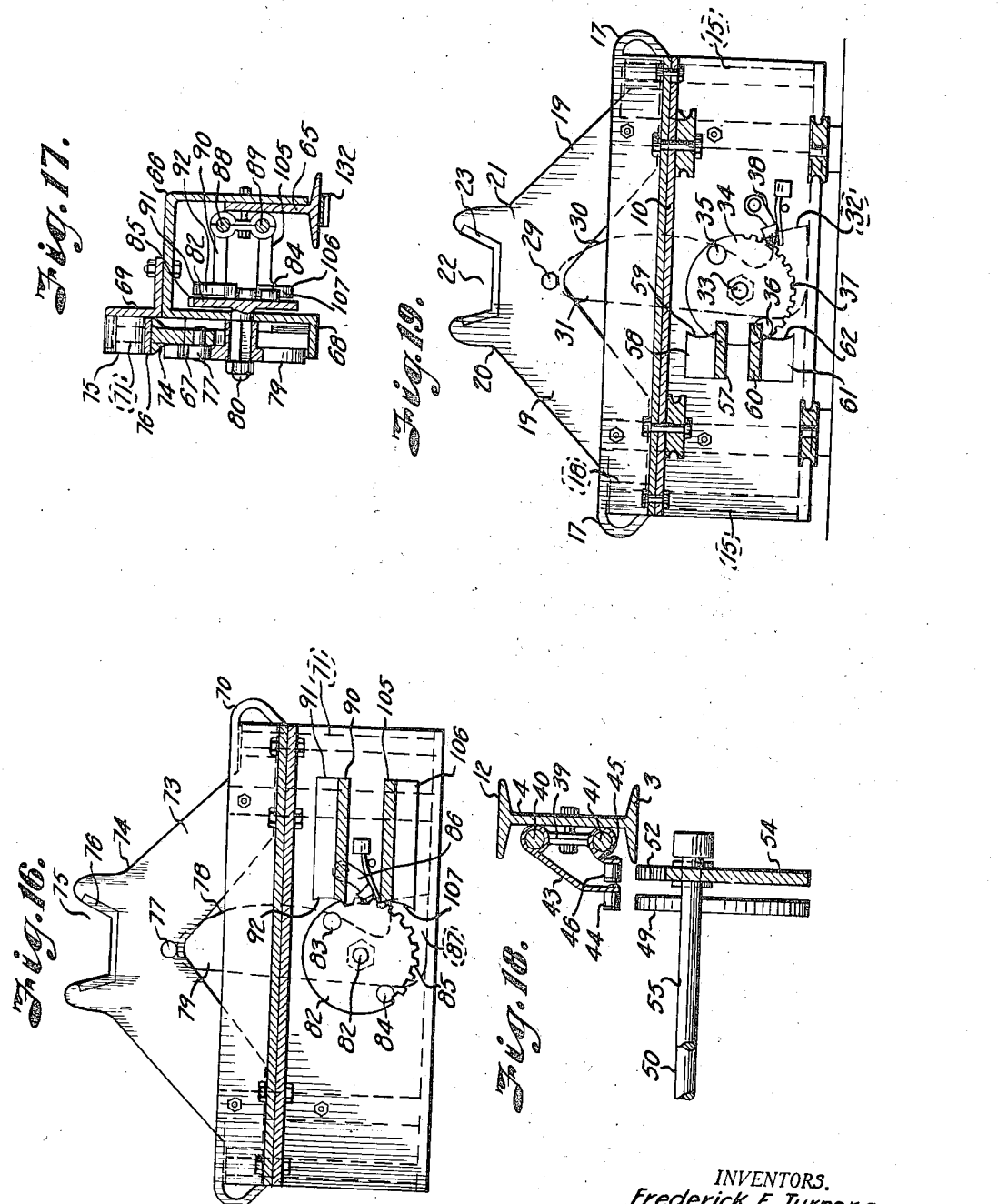

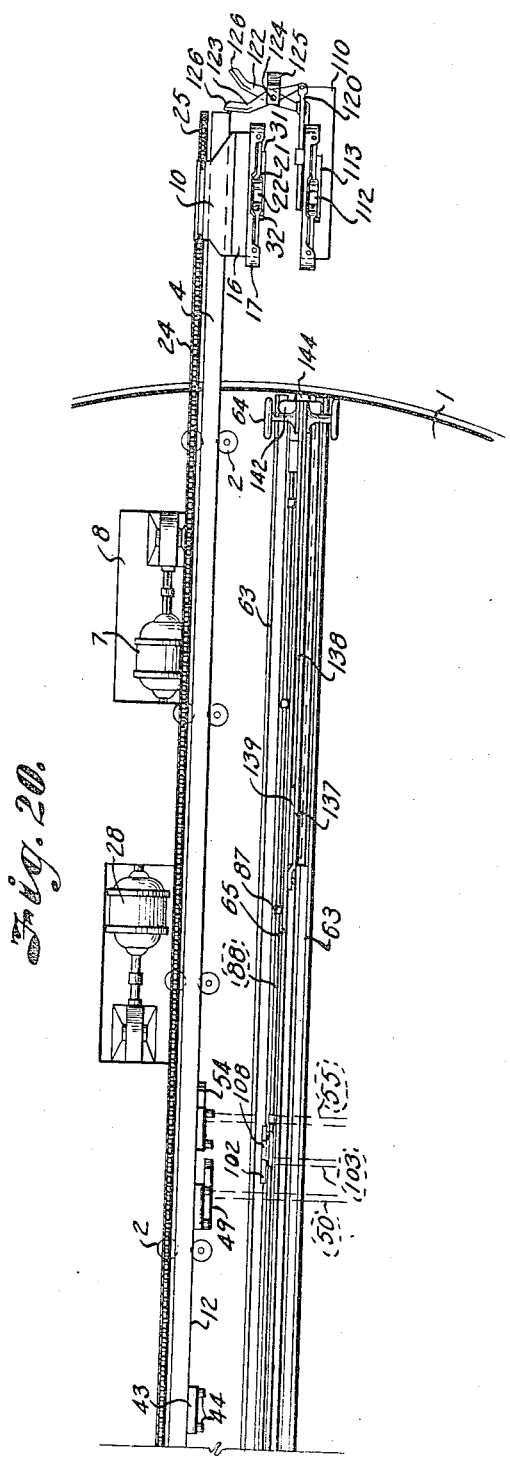

Patented Aug. 18, 1936

2,051,062

UNITED STATES PATENT OFFICE 2,051,062

APPARATUS FOR LOADING AND UNLOADING VEHICLES

Frederick E. Turner and William P. Allred, Jr., Kansas City, Mo.; Katherine Turner executrix of said Frederick E. Turner, deceased Application December 26, 1931, Serial No. 583,208

13 Claims. (Cl. 104—50)

Our invention relates to apparatus for loading and unloading vehicles, and more particularly to an apparatus for handling motor vehicles while being placed in and removed from storage or parking.

This device is particularly adapted for storage and parking garages employing elevators instead of ramps for reaching various floor levels and eliminates entirely the necessity of using the motive power of the vehicle from the time it is driven to the entrance to the elevator until it is delivered to the patron in the exit.

The device also locks the vehicle against accidental movement. By the use of the device, the garage attendant need not know how to drive the vehicle, nor need he enter the car to set brakes, as all moving and locking is controlled by the elevator operator who does not leave his station to complete the various steps needed, all of the locking and moving being done by a mechanical means engaging an axle.

An important feature of our device is that the driver need not leave the switch key in the vehicle. This prevents unauthorized use of the vehicle while the driver is away which frequently occurs when a vehicle is parked frequently for definite periods. It also tends to keep the vehicles clean inside as the doors can be locked upon leaving the vehicle, thereby keeping the garage attendants out of the car, and protects the safety of articles left therein.

Another important feature is that by the use of our device the vehicles are so placed when moving from the platform onto the dock that the scratching or denting of fenders, by coming in contact with other vehicles, walls or pillars, is eliminated.

The vehicle moving, as practiced by us, is accomplished as aforesaid without using the motive power of the vehicle, and hence the presence of monoxide gases in a building equipped with our device is reduced to a minimum.

Our device is especially adapted for use in connection with the device shown in Letters Patent No. 1,782,671, dated November 12, 1930, for "Storage and parking garage" and issued to William P. Allred, Jr., the construction and moving of our platform being almost identical with the platform shown in said Letters Patent.

In the drawings:

Fig. 1 is a fragmental plan view of a platform with our device in position thereon.

Fig. 2 is a vertical section of the same taken on the line 2—2, Fig. 1, and looking in the direction of the arrows.

Fig. 3 is a vertical section of the same taken on the line 3—3, Fig. 1, and looking in the direction of the arrows.

Fig. 4 is an enlarged end view of the loading means on the platform with its support in section.

Fig. 5 is a side elevation of Fig. 4 showing the same associated with the holding means.

Fig. 6 is a top plan view of Fig. 4.

Fig. 7 is an end elevation of the holding means.

Fig. 8 is a fragmental side elevation of a portion of the unloading means.

Fig. 9 is an end elevation of the same.

Fig. 10 is a top plan view of Fig. 8 with parts broken away and illustrating a portion of the operating mechanism.

Fig. 11 is a section taken on the line 11—11 of Fig. 9, viewed in the direction of the arrows.

Fig. 12 is a top plan view of the unloader showing the position of the supporting wheels.

Fig. 13 is a fragmental side elevation of the unloader and its releasing mechanism.

Fig. 14 is a section of the same taken on the line 14—14, of Fig. 13, and viewed in the direction of the arrows.

Fig. 15 is a top plan view of Fig. 13.

Fig. 16 is a longitudinal section through the unloading lock on the line 16—16, Fig. 10, showing the same in elevated position.

Fig. 17 is a vertical central section of the same with the lock in lowered position on the line 17—17, Fig. 10.

Fig. 18 is a vertical section of the loader support on the line 18—18, Fig. 2, showing a portion of the loader lock operating mechanism.

Fig. 19 is a longitudinal section of the loader lock on the line 19—19, Fig. 6, showing the same in elevated position.

Fig. 20 is a fragmental top plan view of the platform and dock showing the position of the loading and retaining locks immediately after delivery of a vehicle to the dock.

Fig. 21 is a similar view showing the unloader in extended position.

Fig. 22 is a plan view of one of the disks showing the segmental cut therein.

Referring to the drawings:—

1 represents a movable platform which is preferably rotatable. Mounted on the upper face of the platform 1 are spaced apart sheave wheels or grooved rollers 2. These rollers are arranged in two parallel rows and have their axes extending vertically.

The grooves of the rollers receive the lower flange 3 of an I-beam 4 which forms a support or track for the loading carriage as will be hereinafter more fully described. Secured to the lower face of the flange 3 is a rack 5 which extends longitudinally of the I-beam from one end thereof to the other and engages with the pinion 6 which is placed in operation by a reversing motor 7 which is supported on a platform 8 suspended beneath the platform 1 by straps 9.

A plate 10 is supported above the I-beam 4 by sheaves or rollers 11 which engage with the edges of the top flange 12 of the I-beam 4. The plate 10 is provided with a depending portion 13, the lower edge of which carries the outwardly extending portion 14 which acts as a support for the lower ends of parallel guide rods 15.

A plate 16 is secured on the plate 10 and is provided at each end with outwardly extending ears 17 which serve as supports for the upper ends of the guide rods.

The guide rods 15 pass through perforated lugs or ears 18 formed on the legs 19 of the axle engaging member 20 which is provided. The legs incline upwardly toward each other and form a loading lock 21 which is provided in its upper edge with an axle receiving recess 22 which may be provided with a resilient lining 23 so as not to mar the axle.

Secured to opposite ends of the plate 10 are opposite ends of a sprocket chain 24. This chain passes around idler sprockets 25 located adjacent each end of the I-beam 4. The sprocket chain 24 also passes over idler sprockets 26 carried by the platform 1, and is in engagement with the driving sprocket 27 which is driven by a reversing motor 28. This motor is suspended below the platform 1 in the same manner as the motor 7.

The loading lock 21 has a roller 29 projecting from its outer face, which roller is in vertical alignment with the vertical center line of the recess and is adapted to contact with the cam face or edge 30 of the lever 31. The lever 31 is also provided with a foot 32 which is designed to contact with the portion 14 of the plate 10 and limit the movement of the cam lever 31 in one direction.

The cam lever is fixed to one end of a stud or pivot 33 which is rotatable and passes through the portion 13 of the plate 10. A disk 34 is fixed to the opposite end of the pivot so that the cam lever 31 and disk 34 will move in unison. Projecting from the outer face of the disk 34 and extending toward the I-beam 4 are pins 35 and 36 by means of which the disk is rotated in a manner to be later described. The rotation of the disk will also rotate the cam lever, bringing the cam edge 30 into contact with the roller 29 and raising the web into the position shown by dotted lines in Fig. 5, so that the vehicle axle will enter the notch 22. The disk 34 is also provided on at least a portion of its periphery with teeth or detents 37 with which a spring-actuated pawl 38 is adapted to engage and thus prevent accidental retrograde movement of the cam lever when the same is in raised position.

Secured to the I-beam 4 are supporting brackets 39 (Figs. 2 and 18) in which rods 40 and 41 are slidably mounted. Secured to the rod 40 are a plurality of outwardly and downwardly extending plates 43 which carry outwardly projecting rollers 44 at their lower corners. The rod 41 carries similar plates 45 which are located directly back of the plates 43 and which are similarly provided with projecting rollers 46.

The rollers 44 are designed to be contacted by edges 47 and 48 formed by a segmental cut in a disk 49 (Fig. 2) which is attached to one end of a shaft 50 rotatably carried by the platform 1. The opposite end has a lever 51 (Fig. 1) attached thereto by means of which the disk is rocked, the edge 47 moving a plate 43 and the rod 40 in one direction and the edge 48 imparting an opposite movement thereto.

The rollers 46 are designed to be contacted by the edges 52 and 53 formed by a segmental cut in the disk 54 which is secured to one end of a shaft 55 rotatably carried by the platform 1. A lever 56 is secured to the opposite end of said shaft for rocking the disk 54 so as to move the rod 41 carrying the plates 45 backwardly and forwardly.

Carried at opposite ends of the rod 40 are outwardly extending plates 57 having their outer edges upturned as at 58. One end of each of said upturned portions is concaved as at 59 and this edge is designed to contact the pin 35 when the rod 40 is moved in one direction to rotate the disk in one direction.

Plates 60 having their outer edges 61 downturned are secured to the rod 41 at opposite ends thereof. The downturned edges 61 are provided on one end with a concavity 62 designed to contact the pin 36 when the rod 41 is moved in one direction and rotate the disk in the opposite direction.

Secured to the upper face of the platform 1 are parallel angle irons 63. The angle irons are also parallel to the sheave wheels 2 and serve as guides for the wheels 64 which carry a T-iron 65 to which is secured one leg 66 of a substantially inverted U-shaped bracket. The lower edge of the leg 67 of this bracket is outturned forming a flange 68. A plate 69 provided at its ends with projecting ears 70 cooperates with the flange 68 in supporting the guide rods 71 in parallel vertical position.

The guide rods 71 extend through perforated ears or lugs 72 formed on the upwardly converging legs 73 of the unloading lock 74. The upper edge of this lock is provided with a recess 75 for engagement with a vehicle axle and which may be provided with a resilient lining 76.

The unloading lock 74 also has a roller 77 projecting from one face and in line with the vertical center line of the recess 75. The roller is adapted to be contacted by the cam edge 78 of the lever 79 which is fixed to one end of a stud or pivot 80 which passes through the leg 67 of the U-shaped bracket. The lever 79 is also provided with a foot 81 which limits the movement of the lever 79 by contacting the flange 68.

The stud or pivot 80 has a disk 82 secured to its opposite end which is provided on its outer face with pins 83 and 84 which extend toward the T-iron 65. The disk 82 also has a portion of its periphery provided with detents 85 for engagement with a spring actuated pawl 86 which prevents retrograde movement of the lever 79 when the same is in raised position.

Secured to the T-iron 65 are supports 87 in which rods 88 and 89 are slidably mounted. The rod 88 has an outwardly extending plate 90 secured thereto which is provided with an upturned edge 91 having an arcuate end 92 adapted to contact the pin 83 for rotating the disk 82 and lowering the unloading lock. The rod 88 extends substantially the length of the T-iron and carries a depending plate 93 at its opposite end which is provided with an extension 94 which is designed to be contacted by the projection 95 formed on one end of a plate 96 which is slidably carried in a housing 97.

The housing has a double throw cam groove 98 in which rollers 99 carried by the plate 96 ride. The plate 96 also has an extension 100 to which is pivotally attached one end of a connecting rod 101, the opposite end of which is attached to a disk 102 mounted on a shaft 103 rotatably carried by the platform 1. An operating lever 104 is attached to the shaft 103 for rocking the same.

The rod 89 has an outwardly extending plate 105 secured to one end which is provided with a downturned edge 106 having an arcuate end 107 which is designed to contact the pin 84 for raising the unloading lock.

The opposite end of the rod 89 terminates approximately midway the length of the T-iron and has secured thereto a depending plate 108 which is adapted to engage with one edge of a segmental recess 109 formed in the disk 102 whereby longitudinal movement is imparted to the rod 89.

Secured to the floor of the dock is a plate 110 having an upstanding portion 111 which carries a retaining lock 112, and since the general construction of this lock is identical with the loading and unloading locks only the operating parts which differ will be described. The securing lock has a raising lever 113 secured to a stud 114 which also carries a disk 115 having projecting pins 116 and 117 and having detents 118 on its periphery for engagement with a ratchet pawl 119.

Rods 120 and 121 are slidably carried by the upstanding portion 111 and are designed to have one of their ends contact the pins 116 and 117 respectively. The opposite ends of the rods 120 and 121 are pivotally attached to levers 122 and 123 respectively, which are pivotally mounted intermediate their ends on a vertical shaft 124 carried by a frame 125. The free ends of the levers 121 and 122 are widened as at 126 so that contact of the ends of the rods 40 and 41 with their respective levers is assured.

The platform 1 also carries a pair of vertically extending housings 127 connected by a web 128 and have plungers 129 slidably mounted therein. The plungers each have a plate 130 secured to their upper ends which carry horizontally disposed sheave wheels or rollers 131. These rollers engage the edges of the head of the T-bar 65 and provide a vertically flexible mounting for the bar but at the same time also tend to hold the rack 132 which extends along the underside of the head of the bar 65 in mesh with the pinion 133 which is mounted on a shaft 134 carried by the platform 1. A reversing motor 135 is suspended below the platform 1 in the same manner as the motors 7 and 28, and is connected to the shaft 134 by a flexible connection 136.

Secured to the T-bar 65 are the ends of a strap 137, its intermediate portion being outwardly spaced forming a slot 138 in which is slidably mounted one leg 139 of an angle iron. The remaining leg 140 on the angle iron is slidably supported on a portion of the T-bar head. Secured to the leg 140 is one end of a guide bar 141, its opposite end being provided with a head 142 which is designed to come into contact with a stop 143 carried by the platform 1 and be extended (see Fig. 21) and act as a stop for the forward movement of the T-iron 65. The head extends substantially the width of the space between the angles 63 and tends to prevent lateral movement of the front end of the T-iron when in projected position. The guide bar 140 is moved back to collapsed position, the head 142 striking a stop 144 fixed to the platform 1 when the T-iron is in retracted position.

Secured to the underside of the platform 1 are a plurality of brackets 145 which are equidistant from the center of the platform. Wheels 146 are rotatably carried by the lower ends of the brackets 145 and the wheels in turn are adapted to run on a circular track 147 carried by the auxiliary platform or base 148 so that the platform 1 can be turned at will.

The operation of our device is as follows:

We will assume that all of the parts are in the positions shown in Fig. 1. The vehicle is then driven up to the platform 1 in the direction of the arrow under its own power and halted. The front wheels are then straightened and the transmission placed in neutral. The driver of the vehicle then leaves it in charge of the attendant after first having ascertained that no brakes are set and locking the door which prevents access to the interior of the vehicle.

The attendant then rotates the platform so that the right end of the I-beam 4 in Fig. 2, will be nearest the vehicle. The motors 7 and 28 are started, producing a double movement, projecting the I-beam 4 beyond the edge of the platform and bringing the loading lock beneath the vehicle axle.

The attendant then moves the lever 51 toward his left which causes the edge 48 of the segmental recess in the disk 49 to contact one of the rollers 44 carried by one of the plates 43 and by reason of these plates being secured to the rod 40 this rod will be moved in the same direction as the lever 51. The end of the upturned edge 58 of the plate 57 adjacent the lock contacts the pin 35 carried by the disk 34, rotates it together with the cam lever 30, and raises the axle engaging member into engagement with the axle of the vehicle, after which the lever 51 is returned to neutral position, the pawl 38 engaging with the detents 37 and holding the axle-engaging member in raised position. The motors 7 and 28 are then started in a reverse direction which moves the I-beam 4 to its original position on the platform and also draws the vehicle completely onto the platform 1.

The platform 1 is then moved so that the vehicle can be delivered to its preselected dock and there halted. The attendant then starts the motor 7 which commences to slowly project the I-beam over the edge of the dock and also imparts a slow movement to the vehicle. The motor 28 is then started which operates the chain 5 and draws the vehicle onto the dock. This motor is so speeded that the loading lock will have traveled its full distance before the I-beam completes its travel. The vehicle moves slowly both at the start and finish of its travel into the loading dock.

When the vehicle has reached a position so that the vehicle axle engaged by the loading lock is directly over the recess 112 in the retaining lock, the lever 51 is moved to the right, rocking the shaft 50 and disk 49. This causes the edge 47 of the segmental cut to contact a roller 44 carried by one of the plates 43 to the right, moving the rod 40 and bringing its end into contact with the enlarged portion 126 of the lever 121, rocking it on its pivot 124. This will move the rod 120 and bring its end into contact with the pin 116. This will rotate the disk 115, swing the cam lever 113, and raise the locking member so as to bring it into locking engagement with the vehicle axle.

The lever 51 is then moved to the left sufficiently far to restore the rod 40 to its original position, after which the lever 51 is moved to neutral.

The lever 56 is then moved to the left, engaging a roller 46 carried by one of the plates 45 with an edge of the recess in the disk 54, moving the rod 41 to the left and causing the plate 61 to contact the pin 36, rotating the disk 34 in the opposite direction, and move the cam lever 31 to its starting position which also lowers the axle engaging member 20. The motors 7 and 28 are then started in a reverse direction and restore the I-beam and the locking member to their starting position. The platform 1 is then moved into loading position.

When a vehicle is to be unloaded or removed, the platform is first brought to the proper dock, the motors 7 and 28 started so as to bring the loading lock beneath the vehicle axle. The lever 51 is then moved to the left, causing the edge 48 of the segmental recess of the disk 49 to contact one of the rollers 44 carried by one of the plates 43. This moves the rod 40 to the left, causing the end of the upturned portion 58 of the plate 57 carried by the rod 40 adjacent its right end to contact the pin 35 carried by the disk 34, rotate it together with the cam lever 30 and raise the axle engaging member, after which the lever 51 is returned to neutral position.

The lever 56 is then moved to the right and through the agency of the disk 54 and one of the plates 45. The rod 41 is moved to the right as indicated by dotted lines in Fig. 6, contacting the enlarged end 126 of the lever 122, swinging it on the pivot 124, and cause the end of the rod 123 to contact the pin 117 and rotate the disk 115 and cam lever so as to disengage the retaining lock 112 from the vehicle axle, after which the lever 56 is returned to neutral position.

The motors 7 and 28 are then again started and the vehicle moved until the vehicle axle is positioned above the recess in the unloading lock.

The motors are then stopped and the platform moved to its unloading position. The lever 104 is then moved to the left. This will rotate the shaft 103 and disk 102, causing one edge of the segmental recess 109 formed in the disk 102 to contact the plate 108 and move the rod 89 toward the left. This will move the plate 105 carried by the rod 109 to the left, causing the end 107 of the downturned edge 106 to contact the pin 84 carried by the disk 82, rotating it and the cam lever 78 so as to raise the unloader locking member. The lever 104 and the rod 89, together with its associated elements, are then returned to neutral.

The axle engaging member of the loading lock is then lowered by moving the lever 56 to the right. This movement through the shaft 55, cam 54 and one of the plates 45 will move the rod 41 to the right, causing the end of the downturned edge 61 of the plate 60 to contact the pin 36 rotating the disk 34 and thereby lower the cam lever and lock. The lever 56 is then returned to neutral and the motor started.

It is to be understood that the pawl 38 as well as the pawls on the retaining and unloading lock do not form positive locks but will permit the rotation of the disks controlling the cam lever movements when the levers are operated, but they provide sufficient resistance to prevent accidental lowering of the axle engaging members.

The pinion 133 rotated by the motor then feeds the T-bar forward. When the forward movement is nearly completed the head 142 of the bar 141 engages the stop 143. This holds the bar against further movement, the T-bar being free to move until the leg 139 of the angle iron reaches the end of the slot 138. At this time the vehicle has been removed from the platform and the motor 135 stopped.

The lever 104 is then moved to the right, moving the rod 101 which is pivoted at one end to the disk 102 to the left, moving the plate 96 to the left. This will cause the rolls 99 to ride in the cam groove 98, causing the plate 96 to rise upwardly as it moves forwardly. The forward movement of the plate 96 will cause the projection of this plate to contact the extension 94 formed on the plate 93 which is carried at one end of the rod 88. This will move the rod 88 to the left, bringing the end 92 of the upturned edge 91 formed on the plate 90 carried by the rod 88 into contact with the pin 88 on the disk 82, rotating it and the cam lever 79 to their starting position. This disengages the unloader locking member from the vehicle axle. The motor 135 is then reversed and the T-iron and its associated parts returned to their starting position. During the latter part of this return the head 142 of the bar 141 contacts the stop 144 and is pushed back until it rests against the end of the T-iron.

The vehicle is now ready to be entered by the driver and be driven away.

It will be seen from the foregoing that during the entire moving of the vehicle it has not been touched in any manner by employees of the storage building and consequently no complaints that the vehicle has been finger-marked or otherwise soiled by contact with the person of such employees can be made.

It is also to be understood that the motors used in our device are of the standard reversing type which can be purchased in the open market and in themselves form no part of our invention.

What we claim and desire to secure by Letters Patent is:

1. A device of the class described comprising a platform, a support longitudinally movable on said platform, means for moving said support backward and forward, a loading lock movably carried by said support, means for moving said loading lock longitudinally of said support, and means for operating said loading lock.

2. A device of the class described comprising a platform, a longitudinally movable support located thereon, means for moving said support, a loading lock carried by said support, means for moving said loading lock longitudinally of said support, a second longitudinally movable support located on said platform and parallel to said first mentioned support, an unloading lock secured to one end of said last named support, means for operating said unloading lock, and means for moving said last named support forward and backward substantially its full length.

3. In a device of the class described, the combination with a securing lock and a platform adapted to be moved into proximity thereto, of a loading lock movably located on said platform, means for engaging and disengaging said loading lock with the axle of a motor vehicle placed on said platform, means for moving said loading lock so as to back said vehicle from said platform sufficiently far to bring said vehicle axle into proximity to said securing lock, and means for returning said loading lock.

4. In a device of the class described comprising the combination with a platform, of a support longitudinally movable on the platform and having substantially the same length as the platform, an unloading lock secured to one end of said support, means carried by said support for moving said unloading lock into operative position, means for operating said means, means for moving said support longitudinally so as to project said unloading lock beyond said platform to a distance substantially the full length of said support, and means for moving said unloading lock from its operative position while the same is in projected position.

5. In an apparatus for loading and unloading vehicles comprising a platform, a loading lock movably supported thereon, means for moving said lock longitudinally across said platform, means for projecting said lock beyond said platform, an unloading lock carried by said platform adjacent said loading lock, and means for projecting said unloading lock beyond said platform.

6. In an apparatus for loading and unloading vehicles comprising a platform, a longitudinally movable loading lock mounted on said platform, an axle engaging member carried by said loading lock, means for operating said axle engaging member, means for moving said lock across said platform, means for projecting said loading lock beyond said platform, an unloading lock movably mounted on said platform, an axle engaging member carried by said unloading lock, means for operating said axle engaging member, and means for projecting said unloading lock beyond said platform in a direction opposite to and parallel with the projection of the loading lock.

7. In an apparatus for loading and unloading vehicles, a movable platform, a longitudinally movable support mounted on said platform, means for moving said support longitudinally so as to project one end thereof beyond the edge of said platform, a loading lock carried by said support, means for moving said lock longitudinally of said support, a second longitudinally movable support mounted on said platform parallel to said first mentioned support, an unloading lock fixed to one end of said second mentioned support, and means for projecting said second mentioned support and the unloading lock beyond the edge of said platform in a direction opposite to the projection of the first mentioned support.

8. In an apparatus of the character described, a movable platform, a support mounted for longitudinal movement thereon, means for projecting one end of said support beyond said platform, a loading lock mounted on said platform, means for moving said lock longitudinally of said support, an axle engaging member carried by said lock, means for moving said axle engaging member into and out of operative position, a second supporting member movably mounted on said platform, an unloading lock secured on one end of said second supporting member, an axle engaging member carried by said unloading lock, means for moving said axle engaging member into and out of operative position, and means for projecting said support and lock beyond the edge of said platform in a direction opposite the projection of the first mentioned support.

9. An apparatus for loading and unloading vehicles including a platform, vehicle moving means supported on the platform, vehicle engaging means carried by the vehicle moving means, means carried by the platform for actuating the vehicle moving means in opposite directions to move the vehicle engaging means across the platform, means for moving the vehicle moving means to project the vehicle engaging means beyond the platform to engage the vehicle so that the vehicle is drawn onto the platform upon movement of the vehicle moving means in one direction and removed from the platform upon movement of the vehicle moving means in the opposite direction, means for actuating the vehicle engaging means to engage and disengage a vehicle, a securing lock spaced from the platform and located adjacent said vehicle engaging means when it is projected from the platform for locking the vehicle from movement after the vehicle is removed from the platform, and means operable by said operating means for the vehicle engaging means to operate the securing lock.

10. An apparatus for loading and unloading vehicles including a platform, a vehicle moving means supported on the platform, vehicle engaging means carried by the vehicle moving means, means on the platform for actuating the engaging means to engage and disengage the vehicle, means operable on the platform independently of said actuating means for operating the vehicle moving means in one direction to draw the vehicle onto the platform and in reverse direction to remove the vehicle from the platform, and a second vehicle removing means on the platform located adjacent said vehicle moving means and arranged to move the vehicle from the platform in the opposite direction.

11. In an apparatus for loading and unloading vehicles including a platform, loading means on the platform operable to engage and draw a vehicle onto the platform from one direction, and unloading means located on the platform adjacent the loading means for unloading the vehicle from the platform in the opposite direction, and means for actuating the vehicle unloading means whereby the vehicle is moved clear of the platform entirely by said unloading means.

12. In an apparatus for loading and unloading vehicles including a platform, vehicle moving means supported on the platform, vehicle engaging means carried by the vehicle moving means, means on the platform for operating said vehicle moving means to engage said engaging means with the vehicle and to draw the vehicle onto the platform, vehicle unloading means movably supported on the platform adjacent said vehicle moving means, vehicle engaging means carried by the unloading means in alignment with the engaging means on the vehicle moving means when the vehicle is loaded onto the platform, means on the platform for releasing said first named engaging means and engaging said last named engaging means to engage the vehicle, and means on the platform for operating said unloading means to remove the vehicle from the platform.

13. An apparatus for loading and unloading vehicles including a platform, loading means on the platform, means for reciprocating the loading means on the platform for drawing a vehicle onto the platform, vehicle unloading means on the platform, and means for reciprocating the unloading means in parallel relation with said loading means for removing the vehicle clear of the platform.

FREDERICK E. TURNER.
WILLIAM P. ALLRED, Jr.